United States Patent [19]

Chapman

[11] Patent Number: 5,205,652
[45] Date of Patent: Apr. 27, 1993

[54] NONLINEAR SPRING SUPPORTED HYDRODYNAMIC BEARING

[75] Inventor: William I. Chapman, Birmingham, Mich.

[73] Assignee: Williams International Corporation, Walled Lake, Mich.

[21] Appl. No.: 931,687

[22] Filed: Aug. 18, 1992

[51] Int. Cl.⁵ .................. F16C 32/06; F16C 17/03
[52] U.S. Cl. ........................ 384/119; 384/106; 384/309
[58] Field of Search ............... 384/106, 103, 104, 119, 384/302, 309, 312

[56] References Cited

U.S. PATENT DOCUMENTS

| | | | |
|---|---|---|---|
| 3,215,480 | 11/1965 | Marley | 384/104 |
| 3,711,169 | 1/1973 | Gardner | 384/309 |
| 3,980,352 | 9/1976 | Carlson | 384/302 |
| 4,457,634 | 7/1984 | Vineiguerra | 384/309 X |

FOREIGN PATENT DOCUMENTS 3544392 6/1987 Fed. Rep. of Germany.

OTHER PUBLICATIONS

"Air Bearing Development at KHD Luftfahrttechnik;" Bernd Domes; *World Aerospace Technology* '90; pp.93-94.

*Primary Examiner*—Thomas R. Hannon
*Attorney, Agent, or Firm*—Lyon & Delevie

[57] ABSTRACT

A compliant hydrodynamic gas bearing comprises a nonlinear spring arrangement for supporting a plurality of tilting arcuate pads which hydrodynamically carry radial journal loads. The nonlinear spring support arrangement enables the bearing to provide increasing load-deflection capacity under extreme loads to limit deflection to a predetermined clearance. The spring arrangement provides nonlinear load-deflection capabilities while operating with a designed constant bending stress.

4 Claims, 2 Drawing Sheets

NONLINEAR SPRING SUPPORTED HYDRODYNAMIC BEARING

BACKGROUND OF THE INVENTION

The present invention relates generally to bearings which provide damping and support between two relatively moveable members, and more particularly to an improved spring support for a self-pressurizing compliant hydrodynamic gas bearing which exhibits a nonlinear load-deflection characteristic useful in controlling shaft dynamics, such as occurs with small, high speed rotors utilized in gas turbine engines.

Compliant hydrodynamic gas bearings are ideally suited to conditions found in high performance machinery subject to extreme conditions of temperature and speed. Such bearings are not subject to significant operational and durability limitations characteristic of bearings which require liquid lubrication and complex lubricant, support, cooling and sealing systems. Hydrodynamic gas bearings provide better performance while simplifying the bearing structure.

Typically, hydrodynamic bearings comprise a housing which supports a relatively large journal or shaft diameter therein. A comparatively small running gap separates the inner diameter of the housing and the outer diameter of the journal. Typical hydrodynamic bearings further employ a spring mounted damping structure within the running gap to facilitate management of manufacturing tolerances and journal deformations due to centrifugal and thermal displacements without detrimental changes to the required bearing tolerances.

As shown in FIG. 1, one known hydrodynamic gas bearing structure 10 comprises a set of tilting pads 12 radially positioned around a journal 14 by a set of bars 16 machined or affixed to the inside of a bearing housing 18. A set of sheet metal segments 20 are positioned between the bars 16 to provide a spring support for the tilting pads 12, thereby achieving static and dynamic load-bearing capabilities relative to the journal 14.

However, the known hydrodynamic bearing 10 shown in FIG. 1 only provides a constant spring rate bearing support over all load conditions. Referring to FIGS. 2A and 2B, the tilting pad 12 contacts about a third of the arch length at the center of spring 20. Tilting pad 12 is designed with reliefs at both ends such that the amount of contacting surface area does not change over the applied load force F. Thus, spring 20 only exhibits a constant spring rate (i.e. linear load-deflection characteristic) until the back of spring 20 would contact housing 18.

SUMMARY OF THE INVENTION

It is an object of the present invention to provide an improved spring support structure in a bearing assembly which exhibits nonlinear load-deflection characteristics.

It is also an object of the present invention to provide an improved hydrodynamic bearing having a nonlinear load-deflection capability which increases as the bearing load increases, whereby a maximum allowable deflection is limited to a predetermined bearing tolerance.

It is further an object of the present invention to provide an improved spring support structure in a bearing assembly having a nonlinear load-deflection capability which cannot be overstressed by extremely large radial loads.

In accordance with the present invention, a compliant hydrodynamic bearing having a nonlinear spring support comprises a bearing housing disposed around a journal, and a plurality of curved spring elements located equidistantly around an inner periphery of the housing. The plurality of spring elements are positioned so as to form a clearance between at least an arcuate portion of each of the plurality of spring elements and the inner periphery of the housing.

A plurality of moveable arcuate pads are disposed between the plurality of spring elements and an outer periphery of the journal for hydrodynamically carrying any radial journal loads. The plurality of arcuate pads are contoured so as to contact a portion of each of the plurality of spring elements. Any radial journal load causes an increase in contacting surface between the plurality of arcuate pads and the plurality of spring elements thereby increasing the load-deflection capability of the spring elements. The plurality of spring elements further operate with a constant bending stress. A plurality of spacer tabs are inwardly affixed to the periphery of the housing to position the plurality of spring elements and arcuate pads relative to the journal.

The present invention will be more fully understood upon reading the following detailed description of the preferred embodiment in conjunction with the accompanying drawings.

BRIEF DESCRIPTION OF THE DRAWINGS

FIG. 5 is a partial cross-section of a small turbine engine employing the nonlinear-spring support hydrodynamic bearing of the present invention.

DETAILED DESCRIPTION OF THE PREFERRED EMBODIMENT OF THE INVENTION

Figure 2:
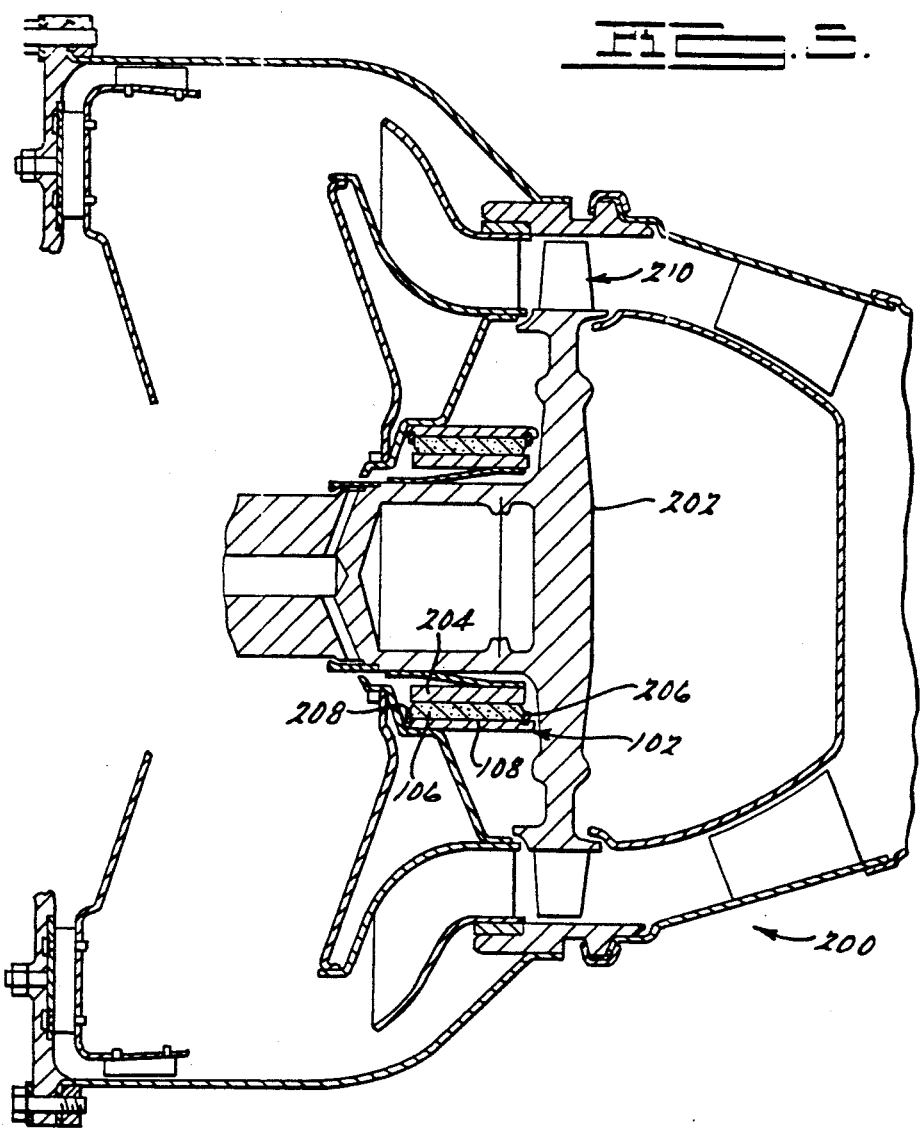
FIGS. 2A and 2B are enlarged cross-sectional views showing the constant load-deflection characteristic of the prior art spring supported bearing of FIG. 1.
Figure 1:
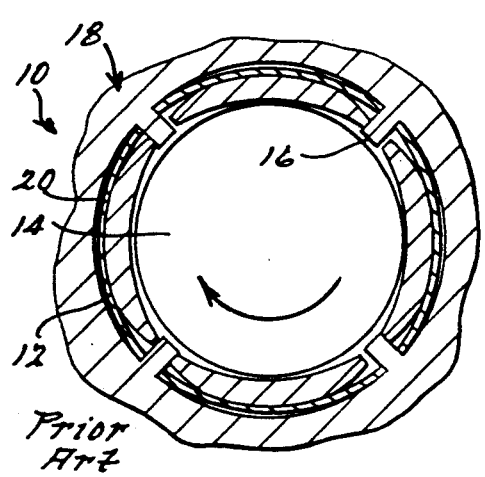
FIG. 1 is a cross-section of a prior art spring supported hydrodynamic bearing.
Figure 3:
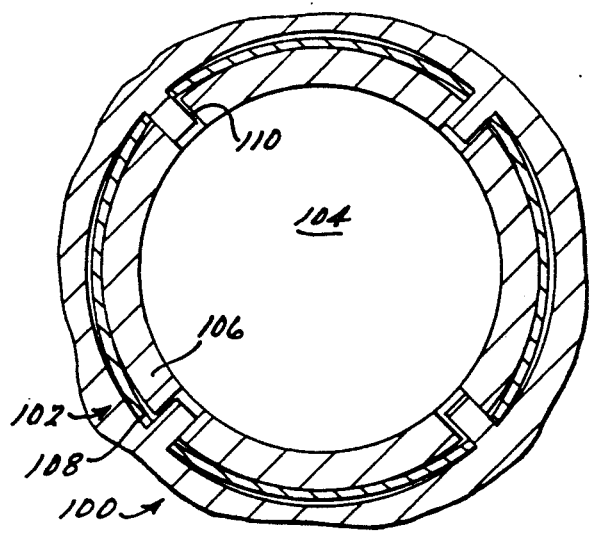
FIG. 3 is a cross-section of a nonlinear spring supported hydrodynamic bearing in accordance with the present invention.
Figure 2A:
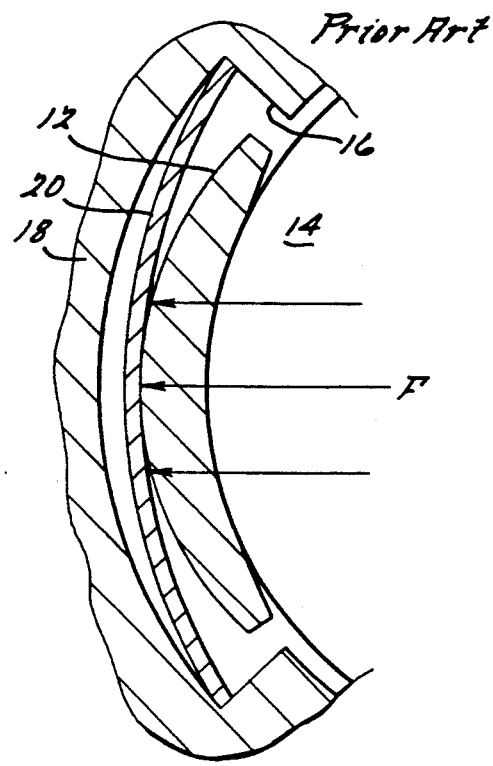
Figure 2B:
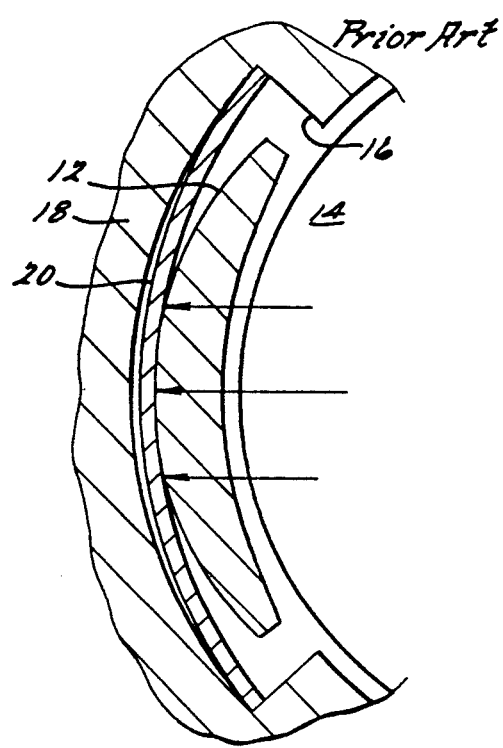

Referring to FIG. 3 of the drawings, a compliant hydrodynamic gas bearing 100 in accordance with the present invention comprises a bearing housing 102 adapted to be disposed about a journal or shaft 104. A plurality of equally-spaced compliant or tilting arcuate pads 106 are supported in radially inwardly spaced relation to the housing 102 by multiple resilient spring elements 108. Each spring element 108 comprises a flat plate of uniform thickness curved on assembly to fit in the annular space between the bearing housing 102 and shaft 104, and circumferentially positioned relative to shaft 104 by a set of spacer tabs 110. Spacer tabs 110 can be integrally machined or welded inwardly of housing 102, or mechanically affixed to the inside of housing 102. Circumferential location of spring elements 108 relative to shaft 104 could alternatively be achieved by welding spring elements 108 to a thin sheet, and subsequently inserting the thin sheet along the inside of housing 102.

The spring elements 108 along with tilting pads 106 comprise a compliant support system which provides stiffness control for the bearing 100. The support system optimizes the hydrodynamic fluid film and load-carrying capacity thereof, bearing damping capability, the provision for staged increase in stiffness with increasing load on the pads 106, and the capability of the bearing 100 to withstand misalignment of shaft 104.

In operation, rotation of the shaft 104 relative to the tilting pads 106 induces the formation of a hydrodynamic film, i.e., a boundary layer of gas, between the shaft surface and the bearing surface of the pads 106. The hydrodynamic gas film is created from the air flow inherently generated by rotation of shaft 104 within the bearing housing 102.

Since the hydrodynamic action of the low viscosity gases does not provide a high load bearing capacity, the spring elements 108 provide for both radial and longitudinal tilting of pads 106 in accordance with the pressure profile of the hydrodynamic gas film. The tilting ability of pads 106 provides a maximum load carrying capacity for bearing 100 so as to tolerate bearing misalignments and skew loads, and to tolerate axial thermal distortions. Load carrying capacity is further enhanced by the geometry of tilting pads 106 relative to spring elements 108 to yield an initial soft layer of support that becomes progressively stiffer in the radial direction, which will be more fully described hereinbelow.

Figure 4A:
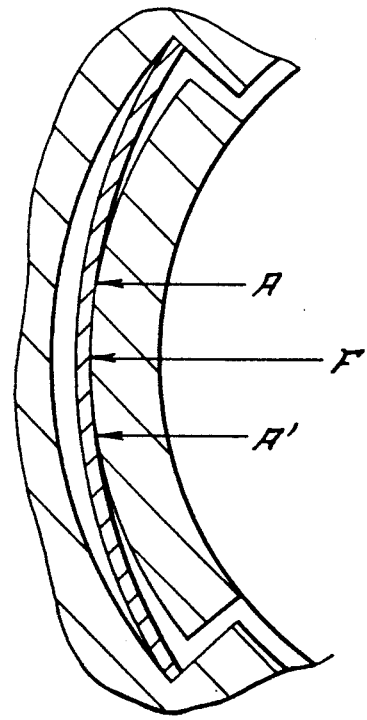
FIGS. 4A and 4B are enlarged cross-sectional views showing the nonlinear load-deflection characteristics of the present invention.
Figure 4B:
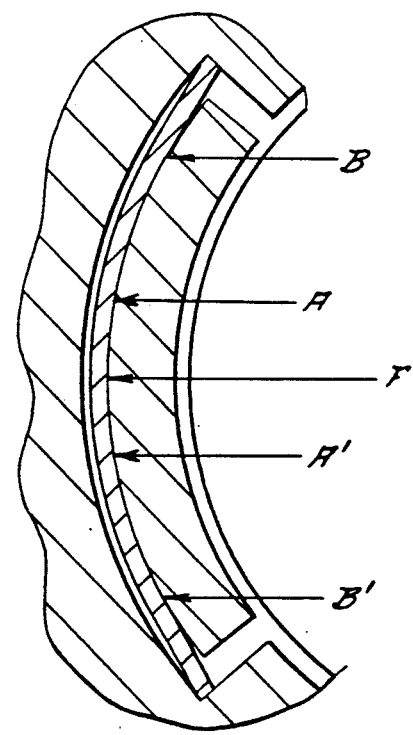

Referring to FIGS. 4A and 4B, an enlarged cross-section illustrates the operation of the spring support in accordance with the present invention. Each spring member 108 operates at a constant bending stress determined by the thickness of the spring 108 and the outer radius of tilting pad 106. The bending stress of spring elements 108 can be limited by design to suit the properties of the chosen spring material. Since the bending stress is constant and limited according to design, spring elements 108 cannot be overstressed, even by extremely high radial loads. Therefore, spring elements 108 are not susceptible to breakage from load stress.

Spacer tabs 110 are arranged to position spring elements 108 and tilting pads 106 relative to the circumference of journal 104, and to carry any circumferential loads placed on tilting pads 106. As shown in FIG. 4A, spring element 108 has a relatively large radial clearance with housing 102, and exerts a low preload (i.e. a low spring rate) on tilting pad 106. However, as shown in FIG. 4B, when a radial force F is applied to tilting pad 106, the amount of contacting surface area between pad 106 and spring member 108 increases (shown by arrows A—A' and B—B') as the radial clearance between the spring 108 and the housing 102 decreases. The increasing contact area reduces the free length at both ends of spring members 108, wherein the stiffness or load-deflection characteristic of the spring is rapidly increased.

Although four spring members 108 are shown, this is not to be construed as limiting. The use of three or more equally-spaced spring members 108 is preferred in the present invention, thereby making the radial load-deflection characteristic of the spring support similar for all angular load directions, and approaching axisymmetric as the number of spring members is increased.

In accordance with the present invention, the nonlinear characteristic of the spring support advantageously provides a low spring rate as a bearing support while limiting maximum deflection of the spring members to a predetermined clearance. The nonlinear spring support provides a durable and inexpensive structure for controlling shaft dynamics when utilized in the above described hydrodynamic gas bearing. The low spring rate provides an initial preload on each tilting pad thereby enabling the pads to provide hydrodynamic damping, with or without any applied external forces. The initial preload further insures each tilting pad will assume the correct attitude to form a hydrodynamic film in conjunction with the shaft rotation reaching a speed sufficient to establish the hydrodynamic film. As either a stationary or rotating radial load is applied to the bearing, each pad will tilt as required to hydrodynamically carry the load.

In normal operation, the tilting pads 106 will not make contact with the shaft 104. However, contact may occur when the shaft is stationary, at engine start-up, or during shaft transients when in operation. Thus, the materials and/or coatings used to construct tilting pads 106 must provide reliable operation without excessive wear, galling, or seizing. In the preferred embodiment, graphite pads are used to provide compatibility with a steel shaft in a gas turbine engine, and operating temperatures as high as 1000° F. ($\approx$540° C.).

As noted hereinabove, spring elements 108 are preferably formed from flat plates elastically deformed upon assembly into the annular space between the tilting pads 106 and the housing 102. This arrangement provides well defined spring characteristics for load-deflection and stress. Manufacturing requirements are simplified because the spring elements 108 can be cut from a flat sheet, and clearance in the annulus can be easily controlled by the diameters of the housing 102 and journal 104, and the thickness of spring elements 106 and tilting pads 108. Clearance can additionally be controlled through the placement of thin metal shims between the spring elements 106 and housing 102. Spring characteristics can be modified by preforming, such as by bending, spring elements 106 to a desired radius, or varing the plate thickness as a function of the length of the spring element. Multiple spring members can also be stacked on top of each other to provide increased load.

FIG. 5 shows a partial cross-section of a gas turbine engine 200 utilizing a nonlinear spring support hydrodynamic gas bearing in accordance with the present invention. A rotor 202 is supported at an outer shaft sleeve 204 by the tilting pads 106/spring elements 108 of the hydrodynamic bearing. A pair of retaining rings 206 and 208 are employed in the bearing structure to retain pads 106/spring elements 108 within the bearing housing 102. In operation, if a side load or rotating load (due to rotor unbalance or rotor dynamics) is applied to the tilting pads 106, radial clearance of the spring elements 108 decreases, thereby rapidly increasing the pad load, as described hereinabove. Because the spring support limits load-deflection to a desired predetermined clearance, the clearance required for rotor blade tips 210 within the turbine housing can be minimized based on the desired predetermined clearance.

While the nonlinear spring support of the present invention has been described in context with a hydrodynamic gas bearing, it will be appreciated the nonlinear spring support can further be utilized with oil and water lubricated bearings. It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A compliant hydrodynamic bearing having a non-linear spring support comprising:
    a bearing housing disposed around a journal;
    a plurality of curved spring elements located equidistantly around the inner periphery of said housing, said plurality of spring elements positioned so as to form a clearance between at least an arcuate portion of each of said plurality of spring elements and the inner periphery of said housing;
    a plurality of moveable arcuate pads disposed between said plurality of spring elements and an outer periphery of said journal for hydrodynamically carrying any radial journal loads, said plurality of arcuate pads contoured so as to contact a surface portion of each of said plurality of spring elements, wherein any radial journal load causes an increase in contacting surface between said plurality of arcuate pads and said plurality of spring elements thereby increasing the load-deflection capability of said plurality of spring elements.

2. The compliant hydrodynamic bearing of claim 1 further comprising a plurality of spacer tabs inwardly affixed to the inner periphery of said housing, said plurality of spacer tabs positioning said plurality of spring elements and said plurality of arcuate pads relative to said journal.

3. The compliant hydrodynamic bearing of claim 1 wherein said plurality of spring elements comprises at least three spring elements equidistantly spaced around the inner periphery of said housing.

4. The compliant hydrodynamic bearing of claim 1 wherein said plurality of spring elements operate with a constant bending stress.

* * * * *